US007454700B1

(12) United States Patent
Jones et al.

(10) Patent No.: US 7,454,700 B1
(45) Date of Patent: Nov. 18, 2008

(54) METHOD AND APPARATUS FOR RESTRICTING THE APPLICATION OF FORMATTING TO THE CONTENTS OF AN ELECTRONIC DOCUMENT

(75) Inventors: Brian Jones, Redmond, WA (US); Ziyi Wang, Redmond, WA (US); Marcin Sawicki, Kirkland, WA (US); Christopher H. Pratley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 10/664,734

(22) Filed: Sep. 18, 2003

(51) Int. Cl.
*G06F 17/24* (2006.01)

(52) U.S. Cl. .................. 715/255; 715/248; 715/272

(58) Field of Classification Search .......... 715/530, 715/531, 515, 516, 523, 522, 769, 770, 236, 715/248, 249, 255, 256, 234, 272; 726/26, 726/27

See application file for complete search history.

(56) References Cited

U.S. PATENT DOCUMENTS

| 5,745,910 | A | * | 4/1998 | Piersol et al. ............... 715/515 |
| 5,860,073 | A |   | 1/1999 | Ferrel et al. |
| 6,088,711 | A | * | 7/2000 | Fein et al. ................... 715/523 |
| 6,177,933 | B1 | * | 1/2001 | Young ........................ 715/805 |
| 6,289,458 | B1 |   | 9/2001 | Garg et al. |
| 6,308,273 | B1 |   | 10/2001 | Goertzel et al. |
| 6,321,334 | B1 |   | 11/2001 | Jerger et al. |
| 7,178,102 | B1 | * | 2/2007 | Jones et al. .................. 715/235 |
| 2001/0039551 | A1 | * | 11/2001 | Saito et al. .................. 707/500 |
| 2003/0004957 | A1 | * | 1/2003 | Broman et al. .............. 707/100 |
| 2004/0177321 | A1 | * | 9/2004 | Brown et al. ................ 715/513 |
| 2005/0188307 | A1 | * | 8/2005 | Bailey et al. ................ 715/531 |

OTHER PUBLICATIONS

Barker, D. et al., "Writing in style (word processors)," *BYTE*, vol. 17, No. 6, pp. 306-315 (Jun. 1992).
Brodie, R., "Personalizing Style Sheets (Microsoft Word Tutorial)," *Business Software*, vol. 3, No. 4, pp. 54-55 (Apr. 1985).
Moffett, J. et al., "Computer Assisted Editing," *1983 IEEE Professional Communication Society Conference Record: The Many Facets of Computer Communications*, John Hopkins Applied Physics Lab, Space Dep., pp. 35-43, (1983).
Rinearson, P., "Outlining With Style (Microsoft Word 3.0 Feature)," *PC World*, vol. 4, No. 10, pp. 300-309 (Oct. 1986).

* cited by examiner

*Primary Examiner*—Adam L Basehoar
(74) *Attorney, Agent, or Firm*—Merchant & Gould

(57) ABSTRACT

A method and apparatus are provided for restricting the application of formatting to the contents of an electronic document. According to the method, a request may be received to perform a formatting operation on a portion of the contents of an electronic document. In response to the request, a determination is made as to whether the requested operation should be permitted. If the requested operation is a direct formatting operation, the request may be denied. If the request operation is the application of a style to a portion of the electronic document, the request may be granted if the style is permitted to be applied to the contents of the electronic document.

6 Claims, 8 Drawing Sheets

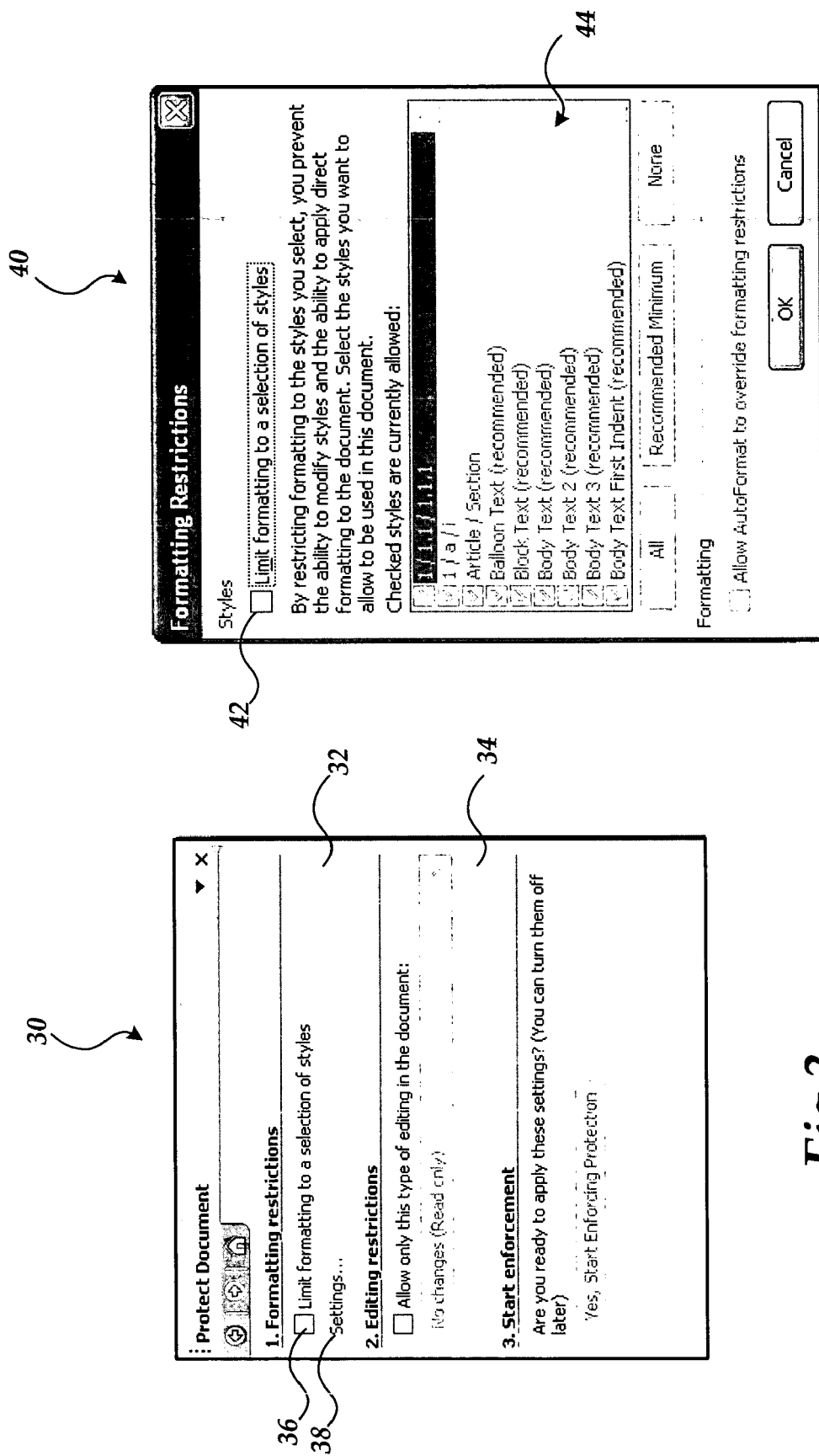

METHOD AND APPARATUS FOR RESTRICTING THE APPLICATION OF FORMATTING TO THE CONTENTS OF AN ELECTRONIC DOCUMENT

TECHNICAL FIELD

The invention generally relates to the field of electronic document editing and, more specifically, to the field of restricting the application of formatting to portions of an electronic document.

BACKGROUND OF THE INVENTION

A common feature in word processing application programs ("word processors") is the template. In a word processor, a template is a pre-designed document that contains formatting and, in some cases, generic text. By using templates, a basic document can be created that others can then use as a starting point for their own documents. For instance, many corporations utilize mandatory templates that users must utilize when filling out various types of reports.

In order to ensure that the look of documents created from a particular template is consistent, a specific layout and formatting may be defined for the template. To facilitate the use of consistent formatting, styles are often defined within templates. A style defines the mode of presentation for some or all of documents created from the template. For instance, a style could be created for a paragraph that defines the alignment, spacing, font, font size, and other formatting attributes for a paragraph. Styles may also be defined for characters, tables, and other data subdivisions contained within electronic documents. Once defined, a style can be easily applied to all or a portion of the electronic document without having to set each of the attributes separately.

Although styles may be easily defined within a template, it has traditionally been very difficult to require users to utilize the defined styles rather than applying formatting directly to the contents of a document. This is primarily due to the ease with which users may apply formatting directly to the contents of an electronic document ("direct formatting") and the lack of familiarity with styles for many users. In many cases, users simply apply direct formatting to the contents of the electronic document so that the contents look similar to the pre-defined style that should have been utilized. For instance, if a template has a style that should be used for headings within a document, a user may directly apply bold formatting and increase the font size of a particular selection so that the section looks similar to the style.

Allowing a user to apply direct formatting to a document rather than using a pre-defined style can cause several problems. First, if a user is allowed to apply direct formatting to a document created from a template, the template author cannot be guaranteed that the document will maintain the desired look defined by the template. Secondly, documents that have direct formatting applied rather than from styles are difficult to update. The style cannot be simply changed with the result that any document utilizing the style will be updated correctly. Rather, each document that had direct formatting applied would need to be changed manually to modify the formatting that had been directly applied. If formatting is applied exclusively using styles, each document created from a template can be updated by simply modifying the style within the template.

It is with respect to these considerations and others that the various embodiments of the present invention have been made.

SUMMARY OF THE INVENTION

In accordance with the present invention, the above and other problems are solved by a method and system for restricting the application of formatting to an electronic document. By utilizing aspects of the invention, template authors can exercise complete control over the application of direct formatting to the contents of an electronic document. Moreover, documents may be created utilizing the various features of the invention that require users to utilize styles when formatting and prevent users from applying direct formatting to the document. The styles made available to a user for application within a particular document can also be restricted.

According to one aspect of the invention, a method is provided for restricting the application of formatting to an electronic document. According to the method, a request may be received to perform a formatting operation on all or a portion of the electronic document. In response to the request, a determination is made as to whether the requested formatting operation is permitted. If the requested formatting operation is not permitted, the request is denied. If the requested formatting operation is permitted, the request will be granted and the requested formatting operation will be performed.

The requested formatting operation may be either a request to apply direct formatting to the contents of the electronic document or to apply a style to the contents of the electronic document. If the requested operation is a direct formatting operation, the request will be denied. In addition, an error message may be provided indicating that direct formatting of the electronic document is not permitted. A list of styles may also be displayed from which a permitted style may be chosen and applied to the electronic document.

If the requested formatting operation is the application of a style to the electronic document, a determination may be made as to whether the style is permitted to be applied to the electronic document. If the style is not permitted to be applied to the requested document, the requested formatting operation will not be performed. If the style is permitted to be applied to the electronic document, the requested formatting operation will be performed. In this manner, direct formatting of an electronic document can be prohibited. Additionally, the application of only permitted styles to an electronic document can be ensured.

According to another aspect of the method provided herein, a request may be received to import data into the electronic document through either an import operation or a copy and paste operation. In response to such a request, the data to be imported may be examined to determine if the data contains styles or direct formatting that is not permitted within the electronic document. If any non-permitted styles or direct formatting are located within the data to be imported, the styles are replaced with permitted styles prior to performing the import operation and the direct formatting is removed. Additionally, any request to create new styles or to modify the permitted styles may be denied. Programmatic operations, such as the execution of macros, that modify the formatting of the electronic document may also be restricted.

According to yet another aspect of the invention, a request may be received to restrict the application of formatting to the electronic document. In response to the request, a user interface may be provided through which one or more styles permitted within the electronic document may be selected. Thereafter, formatting may only be applied to the electronic document through the application of the permitted styles. No formatting of the electronic document through the direct application of formatting attributes may be permitted. Additionally, no addition or modification of styles is permitted.

The invention may be implemented as a computer process for restricting the application of formatting to an electronic document, a computing system for restricting the application of formatting to an electronic document, or as an article of manufacture such as a computer program product or computer readable media. The computer program product may be a computer storage media readable by a computer system and encoding a computer program of instructions for executing a computer process for providing the user interface. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE DRAWINGS

FIGS. 3-11 are screen diagrams illustrating various user interfaces and the features contained therein provided by the embodiments of the present invention.

DETAILED DESCRIPTION OF THE INVENTION

Figure 1:
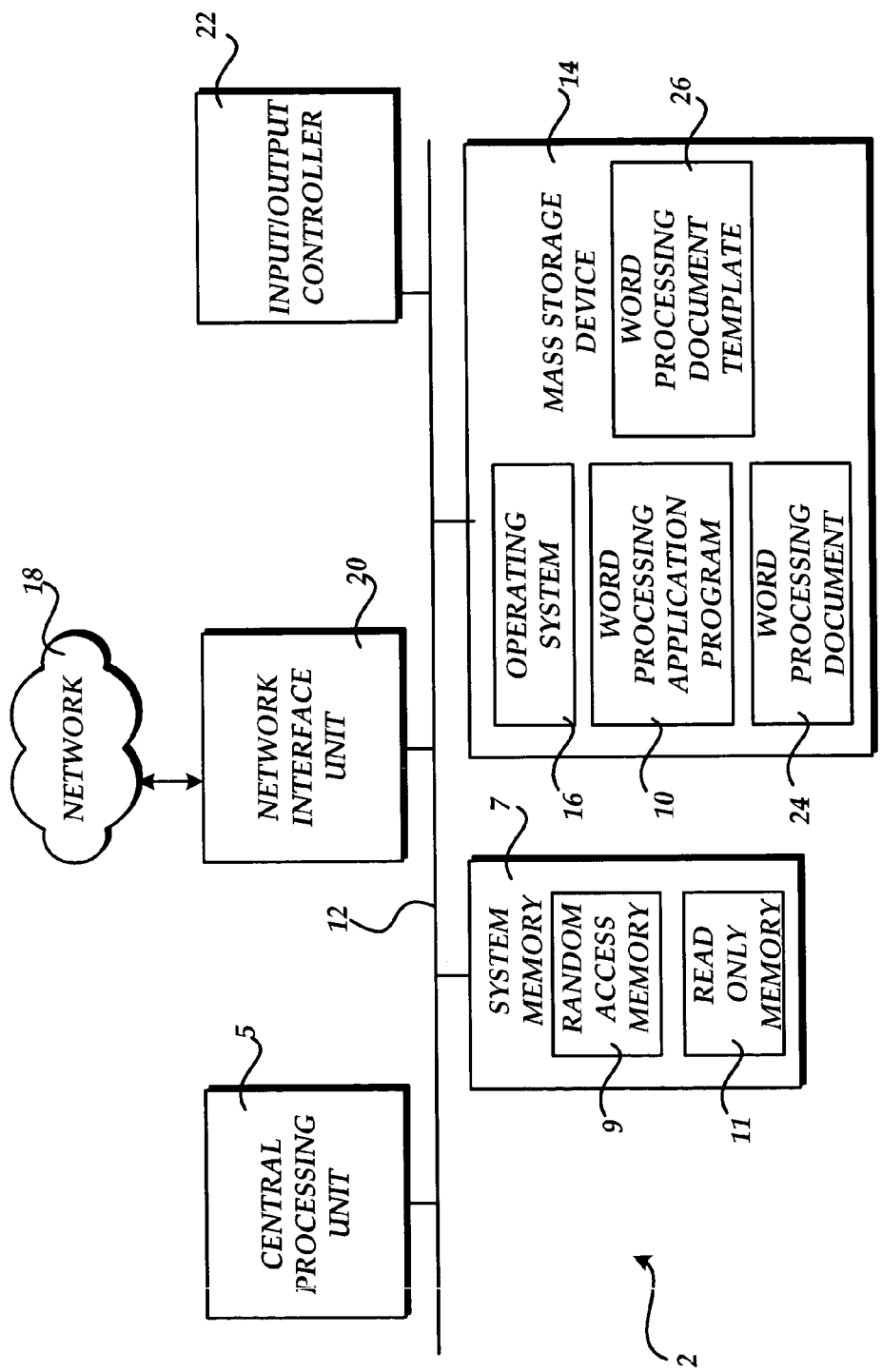
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers, such as an e-mail server computer, through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 10. As known to those skilled in the art, the word processing application program 10 is operative to provide functionality for creating and editing electronic documents, such as the word processing document 24. According to one embodiment of the invention, the word processing application program 10 comprises the WORD word processing application program from MICROSOFT CORPORATION. It should be appreciated, however, that other word processing application programs from other manufacturers may be utilized to embody the various aspects of the present invention.

In conjunction with the editing of a word processing document 24, the word processing application program 10 provides functionality for allowing a user to apply formatting to the contents of the document 24. In particular, the word processing application program 10 provides facilities for applying a variety of formatting attributes to the contents of the document 24. Formatting attributes are settings that define how the data contained in the document 24 is presented. For instance, font, font style, font size, alignment, indentation, line spacing, bold, underline, color, and strikethrough, are examples of formatting attributes. Other formatting attributes are well known to those skilled in the art.

The word processing application program 10 allows formatting attributes to be applied to the contents of the document 24 in a variety of different ways. One way to apply formatting attributes to the contents of the document 24 is through the direct application of formatting. Direct formatting of the contents of the document 24 is performed by directly adding or modifying a formatting attribute on all or a portion of a document. Direct formatting is typically performed by a user by first selecting the portion to be formatted and then selecting the attribute to be applied to the portion from an icon or through a pull-down or contextual menu.

The word processing application program 10 also allows formatting of the document 24 through the use of styles. As discussed briefly above, a style defines a collection of formatting attributes that can collectively be applied to all or a portion of the document 24. For instance, a style may be created that includes a particular font and font size, and centered and underlined text. If the style is applied to text within the document 24, all of the formatting attributes specified by the style will be applied to the text. By creating a style, it is easy to maintain a consistent look between documents. Additionally, a style may be given a descriptive name to provide insight into the type of formatting provided by the style. Once styles have been applied, the appearance of the style throughout the document, or other documents including the style, can be modified by changing the style in just one location. This is much more efficient than the alternative, which is to modify documents by manually changing the formatting throughout the document.

The word processing application program 10 also provides functionality for creating a new word processing document based on a word processing document template 26. As discussed briefly above, a template is a pre-designed document that contains formatting and, in some cases, generic text. By using templates, a basic document can be created that others can then use as a starting point for their own documents. Templates may also define styles that can be applied in a word processing document created from the template.

It should be appreciated that although the embodiments of the invention described herein are presented in the context of a word processing application program 10, the invention may be utilized in application programs for editing other types of documents. For instance, the embodiments of the invention described herein may be utilized within a spreadsheet application program, a presentation application program, a drawing or computer-aided design application program, a database application program, or any other application program that permits formatting operations through the use of direct formatting and through the application of styles.

Figure 2A:
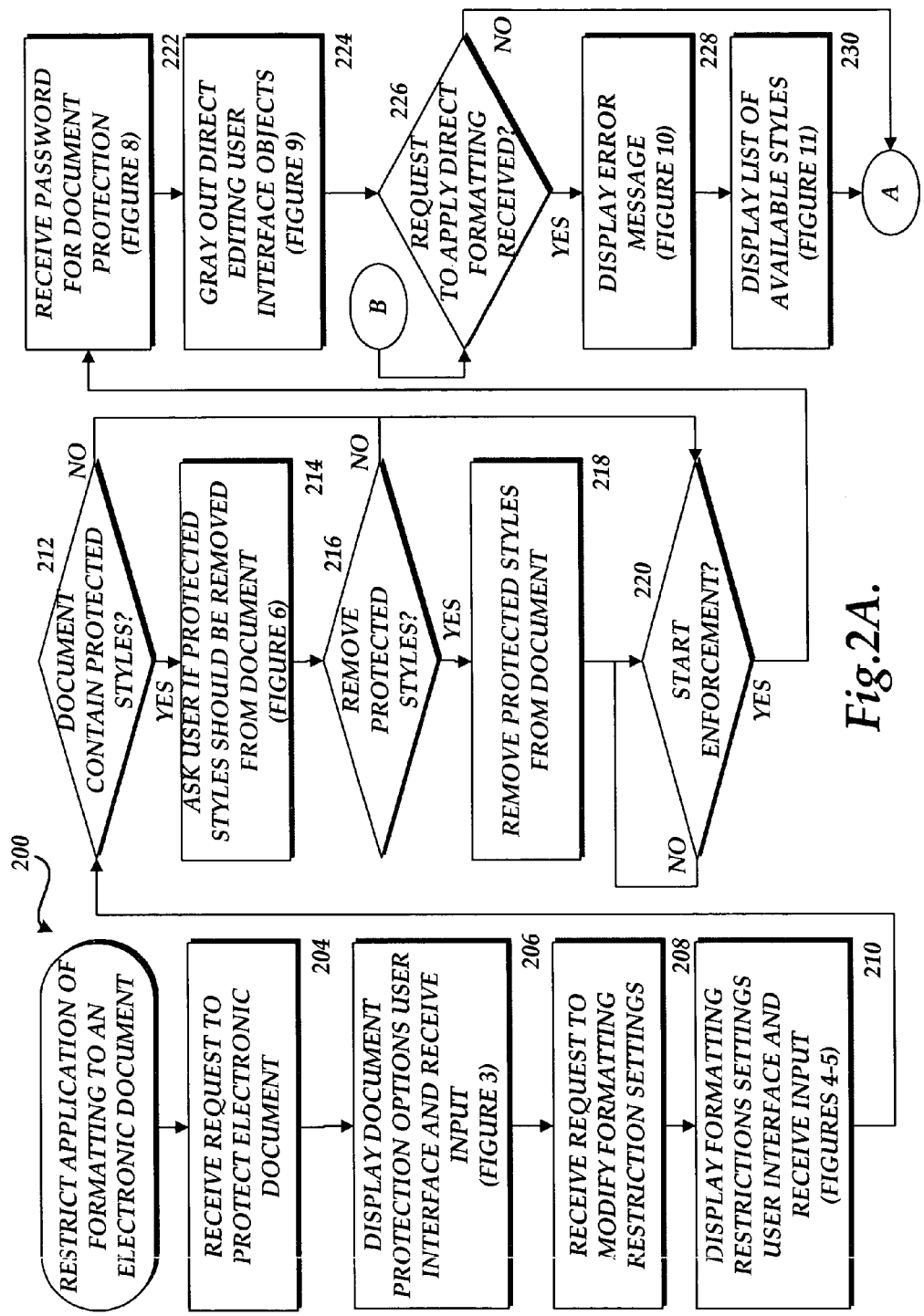
FIGS. 2A-2B are flow diagrams illustrating a process for restricting the application of formatting to an electronic document according to one embodiment of the invention.
Figure 2B:
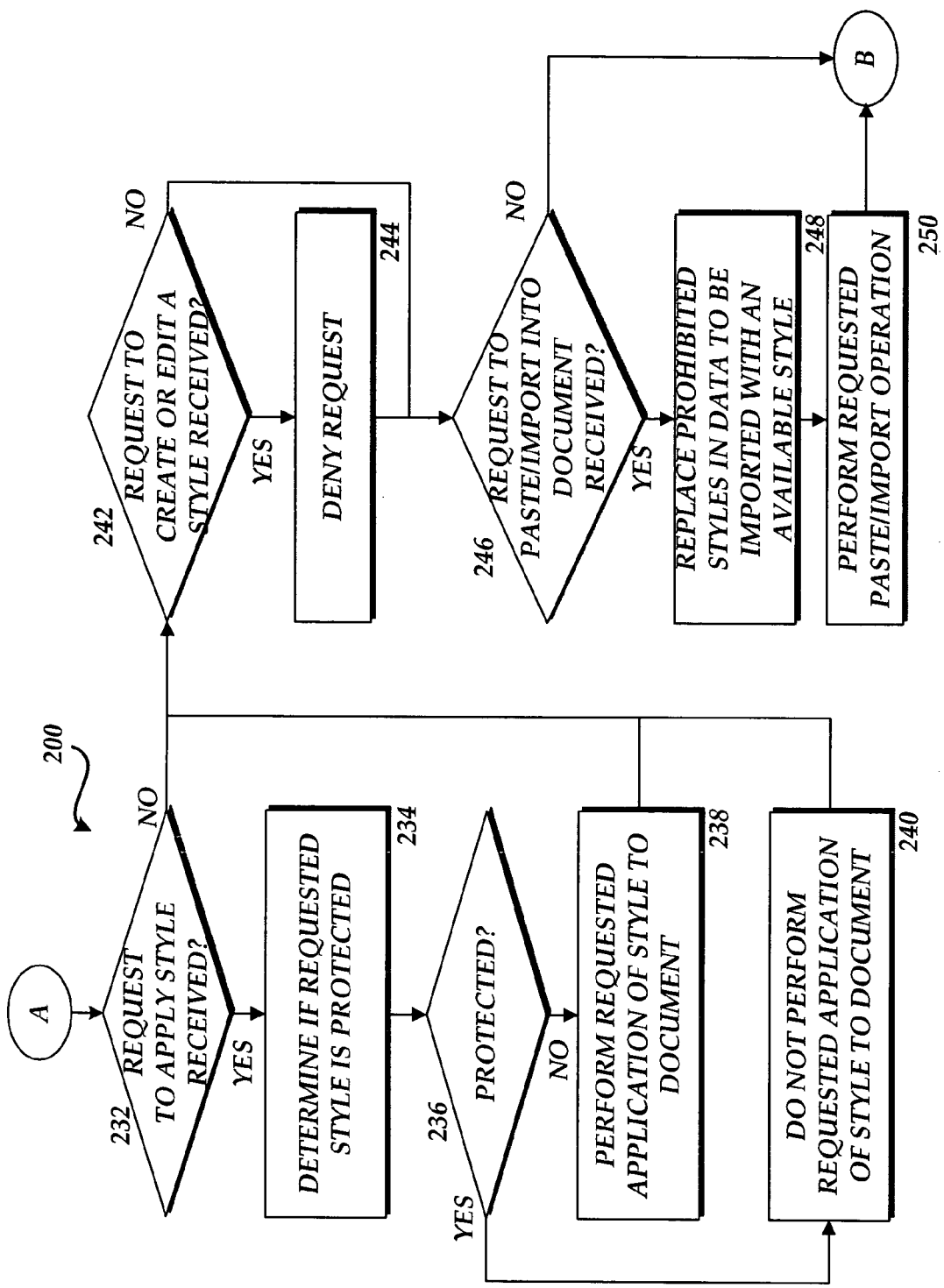

Referring now to FIGS. 2A and 2B, a routine 200 will be described illustrating an exemplary process performed by the word processing application program 10 for restricting the application of formatting to an electronic document.

FIGS. 2A and 2B will be described in the context of the user interface screen diagrams presented in FIGS. 3-11.

When reading the discussion of the routine 200 presented in FIGS. 2A and 2B, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 2A-2B and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

As illustrated in FIG. 2A, the routine 200 begins at operation 204, where a request is received from a user to protect the contents of an electronic document 24 currently being edited in the word processing application program 10. In particular, the request to protect the contents of the document 24 may comprise a request to limit editing operations within regions of the electronic document 24 to authorized users. A process for limiting editing operations within regions of an electronic document is described in U.S. patent application Ser. No. 10/459,089, filed Jun. 11, 2003, and entitled "Method and Apparatus for Protecting Regions of An Electronic Document", which is expressly incorporated herein by reference. The request to protect the contents of the document 24 may also comprise a request to limit the application of formatting to the contents of the document 24 as described herein. The request to protect the contents of the document 24 may be made through an option available through a user interface pull-down menu or other suitable user interface object.

In response to the request to protect the document 24 at operation 204, the routine 200 continues to operation 206, where a user interface dialog box is displayed for allowing a user to set options relating to the protection of the document 24. An illustrative user interface dialog box 30 is illustrated in FIG. 3. As shown in FIG. 3, the dialog box 30 includes a portion 34 for setting options relating to limiting editing operations within regions of the electronic document 24 to authorized users. The dialog box 30 also includes a portion 32 for setting options relating to the restriction of the application of formatting to the document 24. In particular, the portion 32 includes a check box 36. The check box 36 is utilized to prohibit the direct application of formatting to the document 24 and to restrict the application of styles to the document 24 to a user-defined group of permissible styles. When the check box 36 is selected, a user interface button 66 is displayed for enforcing the protection settings (shown in FIG. 7). A button 38 is also available for setting additional options related to the application of formatting to the document 24. If the user chooses not to press button 38, then the routine 200 continues to step 220.

When the user interface button 38 is selected at operation 208, the routine 200 continues to operation 210. At operation 210, the dialog box 40 shown in FIG. 4 is displayed. As shown in FIG. 4, the dialog box 40 includes a check box 42 that maps directly to check box 36. If the checkbox 36 was selected before entering dialog box 40 or if checkbox 42 is selected once in dialog box 40, the user is then allowed to specify the styles that are permitted to be utilized in the document 24. Prior to selection of the button 42, a list 44 of available styles 44 is shown, but the check boxes for each of the styles identified in the list 33 are not selectable. Once the check box 42 has been selected, the styles shown in the list 44 are selectable by a user. This is illustrated in FIG. 5.

Figure 5:
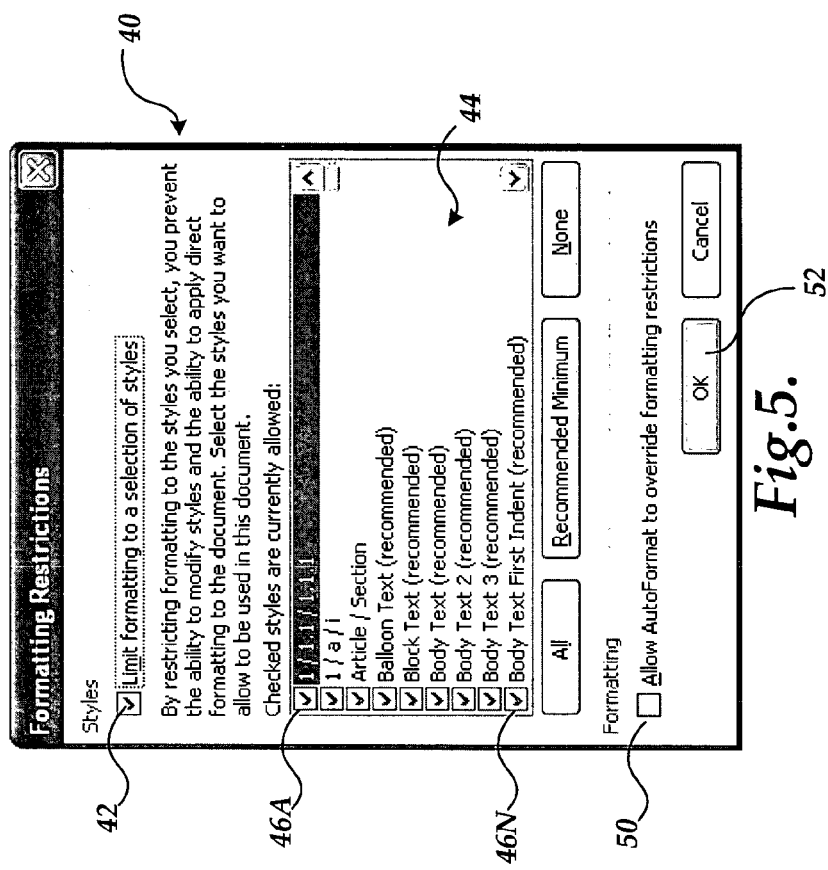

As shown in FIG. 5, the list 44 identifies one or more styles 46A-46N that may be selected using an adjacent user interface check box. Each of the styles 46A-46N that are selected may be utilized in the document 24 while unselected styles may not be utilized. User interface buttons are provided for selecting all of the styles 46A-46N, none of the styles 46A-46N, or a recommended minimum number of the styles 46A-46N. Selection of these buttons will check or uncheck the specified styles in the list 44. According to an embodiment, other styles that are linked to styles not selected in the list 44 may also be disabled.

According to one embodiment of the invention, features of the word processing application program 10 that utilize styles made unavailable through the list 44 may be disabled. For instance, if a style for a table of contents is made unavailable, the feature of the word processing application program 10 for generating a table of contents may be disabled. In this embodiment, the user interface button for selecting the recommended minimum number of styles may be utilized to select all of the styles in the list 44 that would not require disabling a function of the word processing application program 10 if not selected. Alternatively, rather than disabling features, features of the word processing application program 10 that utilize styles made unavailable through the list may be required to utilize an available style or a default style. The user may also be prompted to choose which of the available styles they would like to use as an alternative.

As also shown in FIG. 5, the dialog box 40 includes a user interface check box 50 that, when selected, allows an "auto format" feature of the word processing application program 10 to override the formatting restrictions. The "auto format" feature allows the word processing application program 10 to automatically format portions of the document 24 when certain conditions are met. For instance, if a user begins type data that appears to be a list, numbers or letters may be automatically added by the word processing application program 10 to identify the members of the list. By allowing the auto format feature to override the formatting restrictions, this feature will continue to operate in a normal fashion. However, if the auto format feature is not permitted to override the formatting restrictions and a style utilized by the feature is not permitted in the document (a list style for instance), the auto format feature may be forced to use an inappropriate but allowable style or it may be disabled. It should be appreciated that formatting applied automatically by other features within the word processing application program 10 may also be permitted to override the formatting restrictions imposed by the invention described herein.

If check box 42 is selected, then once the user has selected the "OK" button 52 shown in FIG. 5, the routine 200 continues to decision operation 212. At operation 212, the word processing application program 10 determines whether the document 24 contains any styles that were not selected in the list 44, and therefore not usable by a user within the document 24, or direct formatting which is also not allowed. If the document does not contain any styles not selected in the list 44, the routine 200 branches from operation 212 to operation 220. However, if the document does contain styles not selected in the list 44, the routine 200 continues to operation 214.

Figure 6:
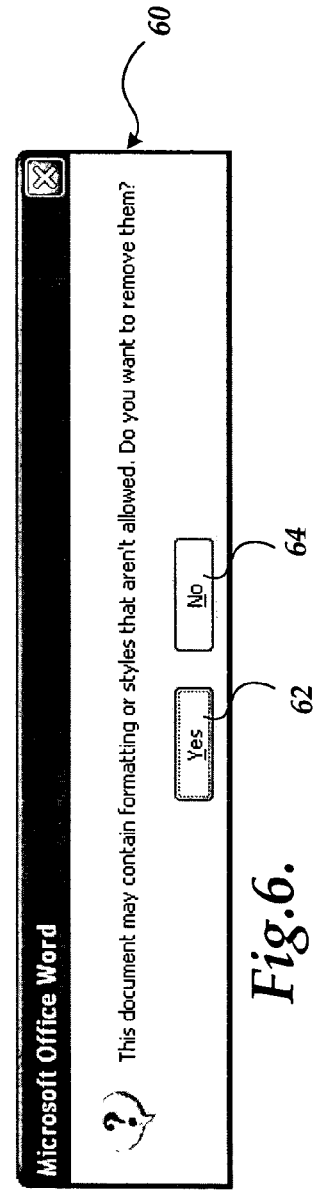

At operation 214, the user dialog box 60, shown in FIG. 6 is displayed to the user. As shown in FIG. 6, the dialog box 60 asks the user whether any formatting or styles that are not allowed should be removed from the document. The user interface buttons 62 and 64 are also provided in the dialog box 60 to receive a response from the user. If the user selects "no" using the button 64, the routine 200 branches from operation 216 to operation 220. If, however, the user selects "yes" using the button 62, the routine 200 continues from operation 216 to operation 218.

At operation 218 any styles contained in the document 24 but not selected in the list 44 are removed from the document 24. These styles may be removed by replacing the styles with styles that were checked in the list 44 or a default style may be automatically applied. Alternatively, the user may be asked which of the allowed styles they would rather use. In this manner, styles that are not usable within the document 24 may be removed. Additionally, any direct formatting that was applied is automatically removed, leaving the text formatted only with the style that is already associated. However, if the user chooses not to remove unavailable styles and direct formatting, a document may be created using styles that are not usable by a user when the protection of the document begins. This may be useful when it is necessary to create a document in which no styles are available. In this case, a document may be creating using one or more desired styles. When the dialog box 40 is displayed, no styles may be selected in the list 44. When protection of the document is begun, the document will utilize styles, but an end user will not be able to apply formatting to the document using either direct formatting or through the application of styles. Instead, the user will only be able to edit the content, and not the appearance.

Figure 7:
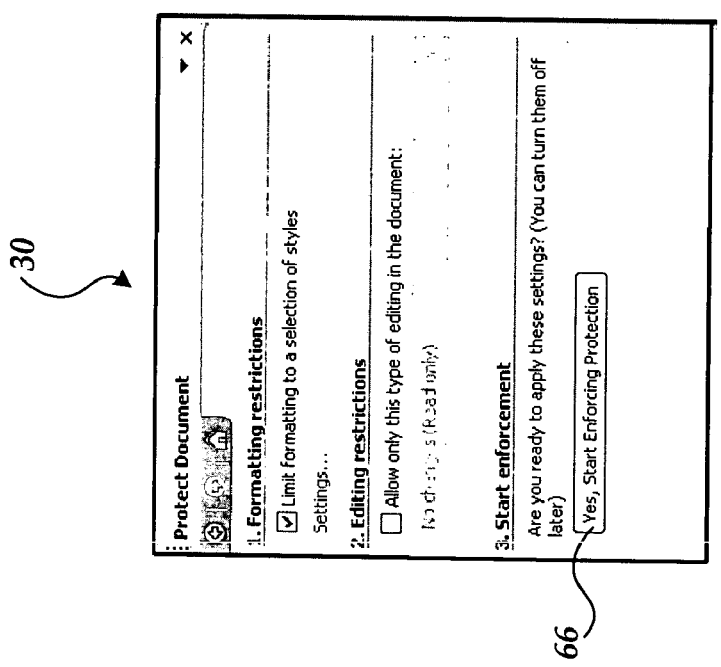

Once the user has made a selection from the dialog box 60, the user interface dialog box 30 shown in FIG. 7 is again displayed to the user. As shown in FIG. 7, the user interface dialog box 30 includes a user interface button 66 that, when selected, will cause the protection of the document 24 to begin. Accordingly, at decision operation 220, a determination is made as to whether the user has requested that protection begin using the user interface button 66. If the user has not requested that protection begin, the routine 200 returns to operation 220 where another determination is made. If the user has requested that enforcement of the document protection start, the routine 200 continues from operation 220 to operation 222.

Figure 8:
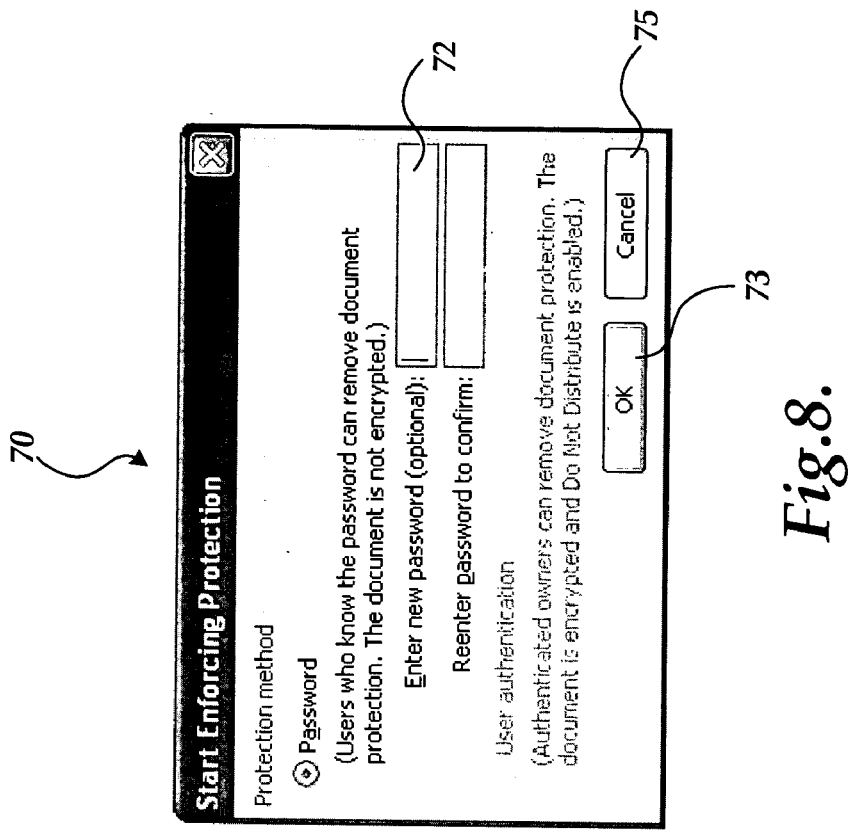

At operation 222, the user interface dialog box 70, shown in FIG. 8, is displayed to the user. As illustrated in FIG. 8, the dialog box 70 includes a text entry box 72 for receiving a password for the user. The password is required to begin and end protection of the document. In this manner, once the restrictions on document formatting have been specified and protection has been started, only an authorized user with the password can disable the document protection. Once a password has been entered, the user can select the button 73 to continue. Alternatively, the user can select the button 75 to cancel the operation.

Figure 9:
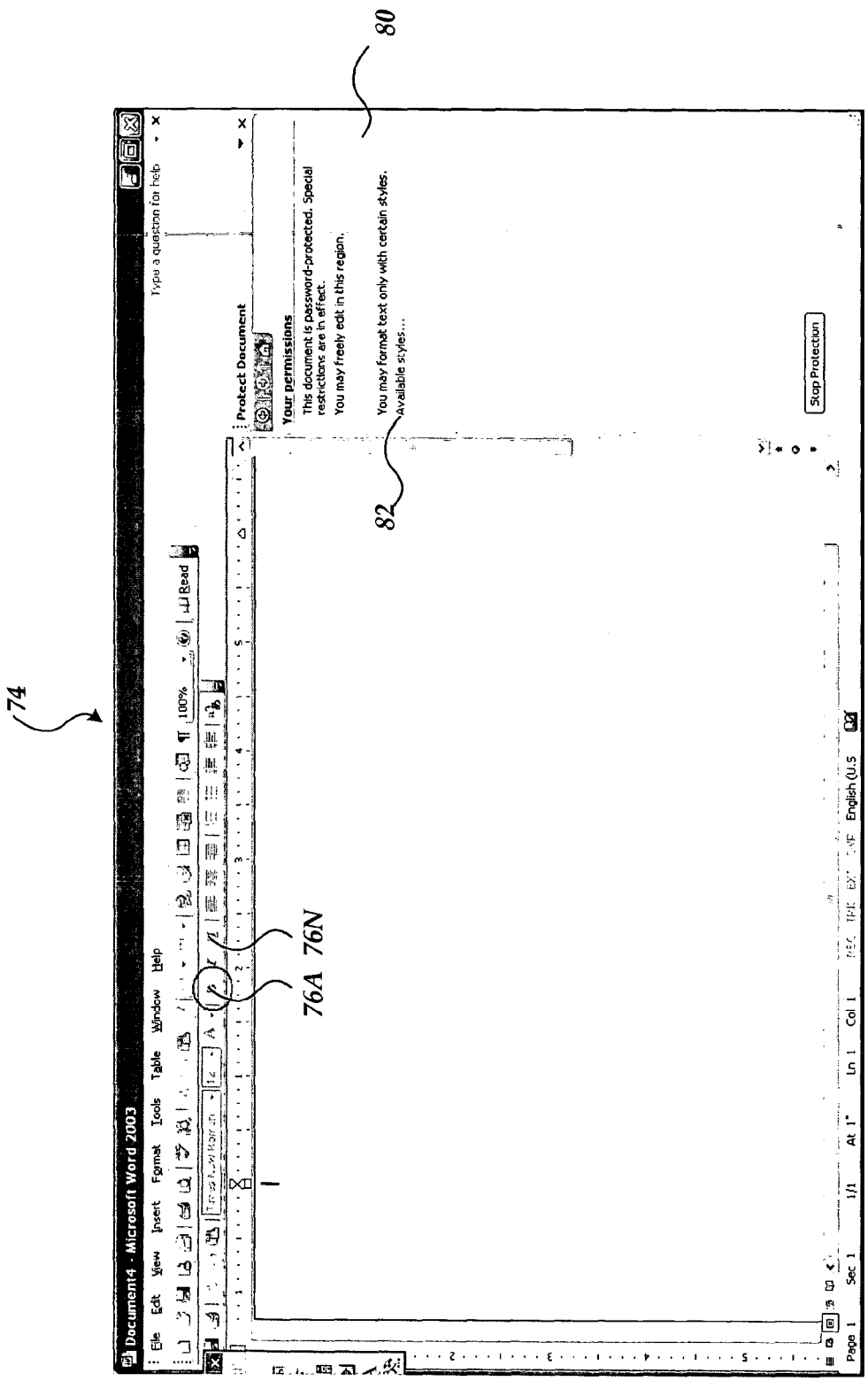
Figure 10:
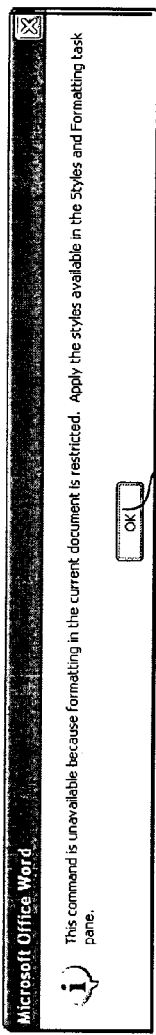
Figure 11:
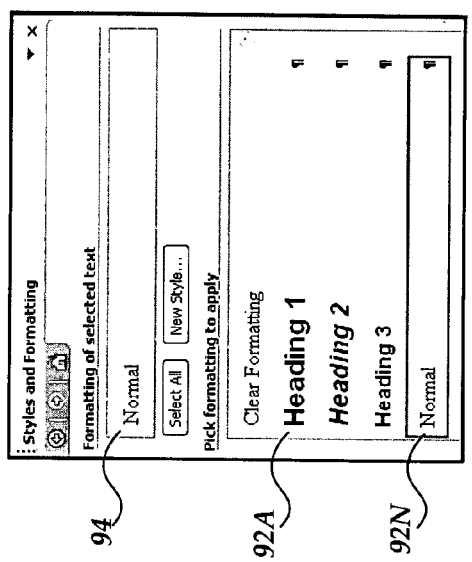

Once the user has entered the password at operation 222, the routine continues to operation 224. At operation 224, the user is returned to the main editing screen of the word processing application program 10. However, because the formatting operations that may be performed within the document 24 are now restricted, user interface objects for performing direct formatting of the document 24 may be removed or otherwise made available at operation 224. For instance, as shown in FIG. 9, the user interface 74 for editing the document 24 normally includes selectable icons for applying direct formatting to the contents of the document 24. However, because direct formatting is restricted, the icons 76A-76N are displayed in a manner to indicate to the user that the formatting provided by these icons is unavailable. For instance, the icons 76A-76N may be displayed as "grayed out." Additionally, a user interface pane 80 is also displayed to the user that includes text 82 indicating that the document is restricted and that text may only be formatted with certain styles.

From operation 224, the routine 200 continues to decision operation 226. At decision operation 226, a determination is made as whether the user has attempted to directly apply formatting to the contents of the document 24. For instance, the user may attempt to select one of the icons 76A-76N or to apply formatting using a key sequence. If no attempt has been made by the user to apply direct formatting, the routine 200 branches from operation 226 to operation 232. However, if the user does attempt to apply direct formatting, the routine 200 continues to operation 228.

At operation 228 an error message is displayed to the user indicating to the user that the requested command is unavailable because the document 24 is restricted. An example of such an error message is illustrated in the dialog box 84 shown in FIG. 10. The dialog box 84 also indicates to the user that styles may be available for use in formatting the contents of the document 24. The user may then select the button 86 to dismiss the dialog box 84.

Once the dialog box 84 has been dismissed, the routine 200 continues to operation 230, where a list of available styles is presented to the user. For instance, the dialog box 88 shown in FIG. 11 may be presented to the user. The dialog box 88 includes a text box 94 indicating the formatting of the selected text and a list 90 identifying the available styles 92A-92N. The list 90 shows only those styles that were made available to the user through their selection in the list 44 when setting protection options. The user can select one of the styles 92A-92N from the list 44 and the selected style will be applied to the currently selected portion of the document 24.

From operation 230, the routine 200 continues to decision operation 232, where a determination is made as to whether a request has been made to apply a style to a portion of the document 24. This request may come from a user or from a programmatic operation, such as the execution of a script or the performance of a feature of the word processing application program 10. If a request to apply a style has not been made, the routine 200 branches to operation 242. If a request to apply a style has been made, the routine 200 continues to operation 234, where a determination is made as to whether the style to be applied is permitted to be utilized within the document 24. If the style is permitted, the routine 200 continues to operation 238 where the requested application of the style is performed. If the style is not permitted, the routine 200 branches from operation 236 to operation 240. At operation 240, the requested application of the style is denied. From operations 238 and 240, the routine 200 continues to operation 242.

At decision operation 242, a determination is made as to whether a request has been made to create a new style or to modify a current style. If such a request has not been received, the routine 200 branches to operation 246. If a request to create a new style or modify a current style has been received, the routine 200 continues to operation 244, where the request to create a new style or modify an existing style is denied. In this manner, styles cannot be edited and no new styles can be created. From operation 244, the routine 200 continues to operation 246.

At operation 246, a determination is made as to whether a request has been made to import data into the current document 24. For instance, data may be imported using an import operation or using a copy/paste operation. If such a request has not been made, the routine 200 branches to operation 226, where protection of the document continues until the appropriate password is provided. If a request is made to import data, the routine 200 continues from operation 246 to operation 248. At operation 248, the data to be imported is scanned to determine if it contains any styles or direct formatting not permitted in the document 24. If prohibited styles are located within the data to be imported, the styles are either removed or replaced with styles that are permitted in the document 24. All direct formatting will be removed leaving just the styles. Any styles that are not allowed will be replaced with default or allowed styles either automatically or after the user has specified their choice. The routine 200 then continues to operation 250 where the requested import operation is performed. The routine 200 then continues to operation 226, where protection of the document continues until the appropriate password is provided.

It should be appreciated that other types of attempts to utilized impermissible styles in a protected document may also be prohibited. For instance, a user may be prohibited from utilizing a template containing styles not authorized by the current protection scheme. Similarly, executable code, such as macro code provided within a template, may not be permitted to apply formatting to a document other than through the application of authorized styles. Alternatively, in embodiments, executable code contained within a template may be permitted to utilize unauthorized styles.

It should also be appreciated that the file format for saving the document 24 is also extended to include data defining the allowable styles within the document 24. For instance, according to an embodiment of the invention, extensible markup language ("XML") is saved with the document 24 that indicates the locked or unlocked state of the document 24 and identifies each of the styles that are available while the document is locked.

It should be further appreciated that although the embodiments of the invention described herein allow certain styles to be disabled for the entire document, a more granular authorization of styles may be utilized. For instance, a document author may specify that only specified styles are available in specified portions of the document. The granularity may allow a user to specify allowable styles for a paragraph or even a character of a document. In one embodiment, a style may even be specified that is applied to the contents of a single XML element.

Moreover, formatting restrictions may be applied to certain portions of a document but not to other portions in embodiments of the invention. This can be automatically applied to documents structured with technologies such as XML. A document author may specify specific XML elements and the style enforcement behaviors for that element.

Additionally, according to one embodiment, the word processing application program 10 may create a new character style when a paragraph style is applied to text within a paragraph. The newly created character style has the same properties as the paragraph style. In this embodiment, when operating in style lockdown mode, the word processing application program 10 will not create a new character style when a paragraph style is applied to less than a full paragraph. Rather, the word processing application program 10 will apply the paragraph style to the entire paragraph. In this manner, any time that a particular style type is applied, it is automatically promoted to apply to the object of its type. For instance, if a paragraph style is applied to a piece of text, the entire paragraph that contains that piece of text will receive the paragraph style that was applied.

It should also be appreciated that an object model may be exposed for setting the various options described herein and for obtaining property values. In particular, the word processing application program 10 may expose a document object that includes a protect method for setting the options relating to the restriction of formatting to the document. Additionally, a style object may be exposed for each style that indicates the locked state of the style. This information can be obtained by querying the style object for the value of the property.

Based on the foregoing, it should be appreciated that the various embodiments of the invention include a method, system, apparatus, and computer-readable medium for restricting the application of formatting to an electronic document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for restricting the application of formatting to the contents of an electronic document, the method comprising:
   receiving a request to restrict the application of formatting to the contents of the electronic document;
   in response to the request, providing a user interface for selecting one or more available styles;
   receiving through the user interface, the selection of one or more styles that may be applied to the contents of the electronic document;
   determining whether styles that may not be applied to the contents of the electronic document should be removed from the electronic document;
   in response to determining that styles that may not be applied should be removed, replacing the styles contained in the electronic document that may not be applied with a style that may be applied;
   receiving a request to apply formatting to the contents of the electronic document;
   in response to the request, determining whether the request comprises a request to apply formatting directly to the contents of the electronic document or a request to apply a style to the contents of the electronic document;
   in response to determining that the request comprises a request to apply formatting directly to the contents of the electronic document, denying the request to apply formatting;
   in response to determining that the request comprises a request to apply a style to the electronic document, determining whether the style comprises one or the one or more styles that may be applied to the contents of the electronic document; and
   applying the style if the style comprises one of the styles that may be applied to the document or denying the request to apply the style if the style does not comprise one of the styles that may be applied to the document.

2. The method of claim 1, further comprising denying any request to create a new style or to modify a style.

3. A computer-readable storage medium which stores a set of instructions which when executed performs a method for restricting the application of formatting to the contents of an electronic document, the method executed by the set of instructions comprising:
   receiving a request to restrict the application of formatting to the contents of the electronic document;
   in response to the request, providing a user interface for selecting one or more available styles;
   receiving through the user interface, the selection of one or more styles that may be applied to the contents of the electronic document;
   determining whether styles that may not be applied to the contents of the electronic document should be removed from the electronic document;
   in response to determining that styles that may not be applied should be removed, replacing the styles contained in the electronic document that may not be applied with a style that may be applied;
   receiving a request to apply formatting to the contents of the electronic document;
   in response to the request, determining whether the request comprises a request to apply formatting directly to the contents of the electronic document or a request to apply a style to the contents of the electronic document;
   in response to determining that the request comprises a request to apply formatting directly to the contents of the electronic document, denying the request to apply formatting;
   in response to determining that the request comprises a request to apply a style to the electronic document, determining whether the style comprises one or the one or more styles that may be applied to the contents of the electronic document; and
   applying the style if the style comprises one of the styles that may be applied to the document or denying the request to apply the style if the style does not comprise one of the styles that may be applied to the document.

4. The computer-readable storage medium of claim 3, further comprising denying any request to create a new style or to modify a style.

5. A system for restricting the application of formatting to the contents of an electronic document, the system comprising:
   a memory storage; and
   a processing unit coupled to the memory storage, wherein the processing unit is operative to:
   receiving a request to restrict the application of formatting to the contents of the electronic document;
   in response to the request, providing a user interface for selecting one or more available styles;
   receiving through the user interface, the selection of one or more styles that may be applied to the contents of the electronic document;
   determining whether styles that may not be applied to the contents of the electronic document should be removed from the electronic document;
   in response to determining that styles that may not be applied should be removed, replacing the styles contained in the electronic document that may not be applied with a style that may be applied;
   receiving a request to apply formatting to the contents of the electronic document;
   in response to the request, determining whether the request comprises a request to apply formatting directly to the contents of the electronic document or a request to apply a style to the contents of the electronic document;
   in response to determining that the request comprises a request to apply formatting directly to the contents of the electronic document, denying the request to apply formatting;
   in response to determining that the request comprises a request to apply a style to the electronic document, determining whether the style comprises one or the one or more styles that may be applied to the contents of the electronic document; and
   applying the style if the style comprises one of the styles that may be applied to the document or denying the request to apply the style if the style does not comprise one of the styles that may be applied to the document.

6. The system of claim 5, wherein the processing unit is further operative to deny any request to create a new style or to modify a style.

* * * * *